(12) United States Patent
Wang

(10) Patent No.: US 7,769,992 B2
(45) Date of Patent: Aug. 3, 2010

(54) FILE MANIPULATION DURING EARLY BOOT TIME

(75) Inventor: Min Wang, Broomfield, CO (US)

(73) Assignee: Webroot Software, Inc., Boulder, CO (US)

( * ) Notice: Subject to any disclaimer, the term of this patent is extended or adjusted under 35 U.S.C. 154(b) by 945 days.

(21) Appl. No.: 11/465,680

(22) Filed: Aug. 18, 2006

(65) Prior Publication Data

US 2008/0046709 A1    Feb. 21, 2008

(51) Int. Cl.
G06F 9/00 (2006.01)
G06F 9/24 (2006.01)
G06F 12/14 (2006.01)
G06F 12/16 (2006.01)
G06F 15/177 (2006.01)

(52) U.S. Cl. .................... 713/2; 713/1; 726/22; 726/24
(58) Field of Classification Search .............. 713/1, 713/2; 726/22, 24
See application file for complete search history.

(56) References Cited

U.S. PATENT DOCUMENTS

| | | | |
|---|---|---|---|
| 5,623,600 A | 4/1997 | Ji et al. | |
| 5,765,030 A * | 6/1998 | Nachenberg et al. | 714/33 |
| 5,920,696 A | 7/1999 | Brandt et al. | |
| 5,951,698 A | 9/1999 | Chen et al. | |
| 6,009,520 A * | 12/1999 | Gharda | 713/1 |
| 6,047,319 A * | 4/2000 | Olson | 709/223 |
| 6,069,628 A | 5/2000 | Farry et al. | |
| 6,073,241 A | 6/2000 | Rosenberg et al. | |
| 6,092,194 A | 7/2000 | Touboul | |
| 6,141,698 A * | 10/2000 | Krishnan et al. | 719/331 |
| 6,154,844 A | 11/2000 | Touboul | |
| 6,167,520 A | 12/2000 | Touboul | |
| 6,310,630 B1 | 10/2001 | Kulkarni et al. | |
| 6,397,264 B1 | 5/2002 | Stasnick et al. | |
| 6,405,316 B1 | 6/2002 | Krishnan et al. | |
| 6,460,060 B1 | 10/2002 | Maddalozzo, Jr. et al. | |
| 6,480,962 B1 | 11/2002 | Touboul | |
| 6,487,601 B1 * | 11/2002 | Hubacher et al. | 709/229 |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |
| 6,772,345 B1 | 8/2004 | Shetty | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungck | |
| 6,910,134 B1 | 6/2005 | Maher et al. | |

(Continued)

OTHER PUBLICATIONS

U.S. Appl. No. 11/257,609, filed Oct. 25, 2005, Michael Burtscher.

(Continued)

Primary Examiner—Mark Connolly
(74) Attorney, Agent, or Firm—Cooley LLP

(57) ABSTRACT

A system and method for enabling access to user-level data is described. One embodiment includes accessing user-level data associated with a kernel-level function using a portable executable (PE) file. The user-level data is accessed during a boot-time of a computer. In this embodiment, the PE file is also accessed using the computer.

6 Claims, 6 Drawing Sheets

U.S. PATENT DOCUMENTS

| | | | |
|---|---|---|---|
| 6,965,968 | B1 | 11/2005 | Touboul |
| 6,996,706 | B1* | 2/2006 | Madden et al. ............... 713/2 |
| 7,058,822 | B2 | 6/2006 | Edery et al. |
| 7,107,617 | B2 | 9/2006 | Hursey et al. |
| 7,380,136 | B2* | 5/2008 | Zimmer et al. ............. 713/193 |
| 7,530,106 | B1* | 5/2009 | Zaitsev et al. ............... 726/24 |
| 2002/0162015 | A1 | 10/2002 | Tang |
| 2002/0166063 | A1 | 11/2002 | Lachman et al. |
| 2003/0005183 | A1* | 1/2003 | Burr et al. ...................... 710/1 |
| 2003/0065943 | A1 | 4/2003 | Geis et al. |
| 2003/0074581 | A1 | 4/2003 | Hursey et al. |
| 2003/0101381 | A1 | 5/2003 | Mateev et al. |
| 2003/0159070 | A1 | 8/2003 | Mayer et al. |
| 2003/0217287 | A1 | 11/2003 | Kruglenko |
| 2004/0030914 | A1 | 2/2004 | Kelley et al. |
| 2004/0034794 | A1 | 2/2004 | Mayer et al. |
| 2004/0064736 | A1 | 4/2004 | Obrecht et al. |
| 2004/0080529 | A1 | 4/2004 | Wojcik |
| 2004/0143763 | A1 | 7/2004 | Radatti |
| 2004/0187023 | A1 | 9/2004 | Alagna et al. |
| 2004/0225877 | A1 | 11/2004 | Huang |
| 2005/0038697 | A1 | 2/2005 | Aaron |
| 2005/0071624 | A1* | 3/2005 | Rothman et al. ............ 713/100 |
| 2005/0114687 | A1* | 5/2005 | Zimmer et al. ............. 713/193 |
| 2005/0138433 | A1 | 6/2005 | Linetsky |
| 2005/0154885 | A1 | 7/2005 | Viscomi et al. |
| 2005/0216759 | A1* | 9/2005 | Rothman et al. ............ 713/200 |
| 2006/0020779 | A1* | 1/2006 | Rothman et al. ............... 713/2 |
| 2006/0031667 | A1* | 2/2006 | Raghunandan ................ 713/2 |
| 2006/0129744 | A1* | 6/2006 | Rothman et al. ............ 711/100 |
| 2006/0161793 | A1* | 7/2006 | Orr ............................. 713/300 |
| 2007/0094496 | A1* | 4/2007 | Burtscher ................... 713/164 |

OTHER PUBLICATIONS

U.S. Appl. No. 11/462,827, filed Aug. 7, 2006, Jerry Schneider.
U.S. Appl. No. 11/482,903, filed Jul. 7, 2006, Patrick Sprowls.
U.S. Appl. No. 11/465,680, filed Aug. 18, 2006, Min Wang.
Codeguru, Three Ways to Inject Your Code Into Another Process, by Robert Kuster, Aug. 4, 2003, 22 pgs.
Codeguru, Managing Low-Level Keyboard Hooks With The Windows API for VB .Net, by Paul Kimmel, Apr. 18, 2004, 10 pgs.
Codeguru, Hooking The Keyboard, by Anoop Thomas, Dec. 13, 2001, 6 pgs.
Illusive Security, Wolves In Sheep's Clothing: malicious DLLs Injected Into trusted Host Applications, Author Unknown, http://home.arcor.de/scheinsicherheit/dl1.htm 13 pgs.
DevX.com, Intercepting Systems API Calls, by Seung-Woo Kim, May 13, 2004, 6 pgs.
Microsoft.com, How To Subclass A Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Yurcik, William et al., A Planning Framework for Implementing Virtual Private Networks, Jun. 2001, IT Pro, IEEE, pp. 41-44.
Bryce Cogswell and Mark Russinovich, RootKitRevealer, Feb. 2, 2006, Sysinternals Freeware, 7 pgs.

* cited by examiner

FILE MANIPULATION DURING EARLY BOOT TIME

FIELD OF THE INVENTION

The present invention relates to data access on a computer. In particular, but not by way of limitation, the present invention relates to methods for enabling access to user-level data during boot-time.

BACKGROUND OF THE INVENTION

User-level applications and/or kernel-level drivers are often configured to use data of an operating system (OS) of a computer in order to function properly. In many instances, the applications and/or drivers directly access the data, use references to the data, or use data that corresponds with the data (e.g., copy of the data). References and/or data that corresponds with data is often hard-coded into user-level applications and/or kernel-level drivers because the actual data of the OS is not always readily accessible by these applications/drivers when needed. Some data, for example, can only be readily accessed and/or used at specific times during a boot-up sequence of the OS and/or during terminal services after login. For example, user-level data/files cannot be readily accessed during early-boot time because file system drivers that enable the reading of user-level data/files have not been loaded When references and/or data that corresponds with the data is hard-coded into user-level applications and/or kernel-level drivers, patches or other update mechanisms must be often employed to update the applications/drivers when, for example, new versions of the OS are released that modify the data and/or locations of the data. Difficulties associated with patching user-level applications and/or kernel-level drivers can result in discrepancies between the references and/or data that corresponds with the data hard-coded in applications and the actual data of the OS. These discrepancies can result in application faults and/or computer system errors. Accordingly, current user-level applications and/or kernel-level drivers are not able to access and use data in a desirable manner.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a method for enabling access to user-level data during a boot-time of a computer system. In one exemplary embodiment, the present invention includes accessing user-level data associated with a kernel-level function using a portable executable (PE) file. The user-level data is accessed during a boot-time of a computer. In this embodiment, the PE file is also accessed using the computer.

Another embodiment of the present invention includes accessing a user-level PE file. A boot loader registry of a computer is also modified during an installation period to include a reference to the user-level PE file. The reference is used by an operating system (OS) during the early boot-time to image the PE file into a memory.

In yet another embodiment, a method includes accessing at least a portion of a user-level index associated with a kernel-level function during an early boot-time of a computer. The portion of the user-level index is processed using the computer.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
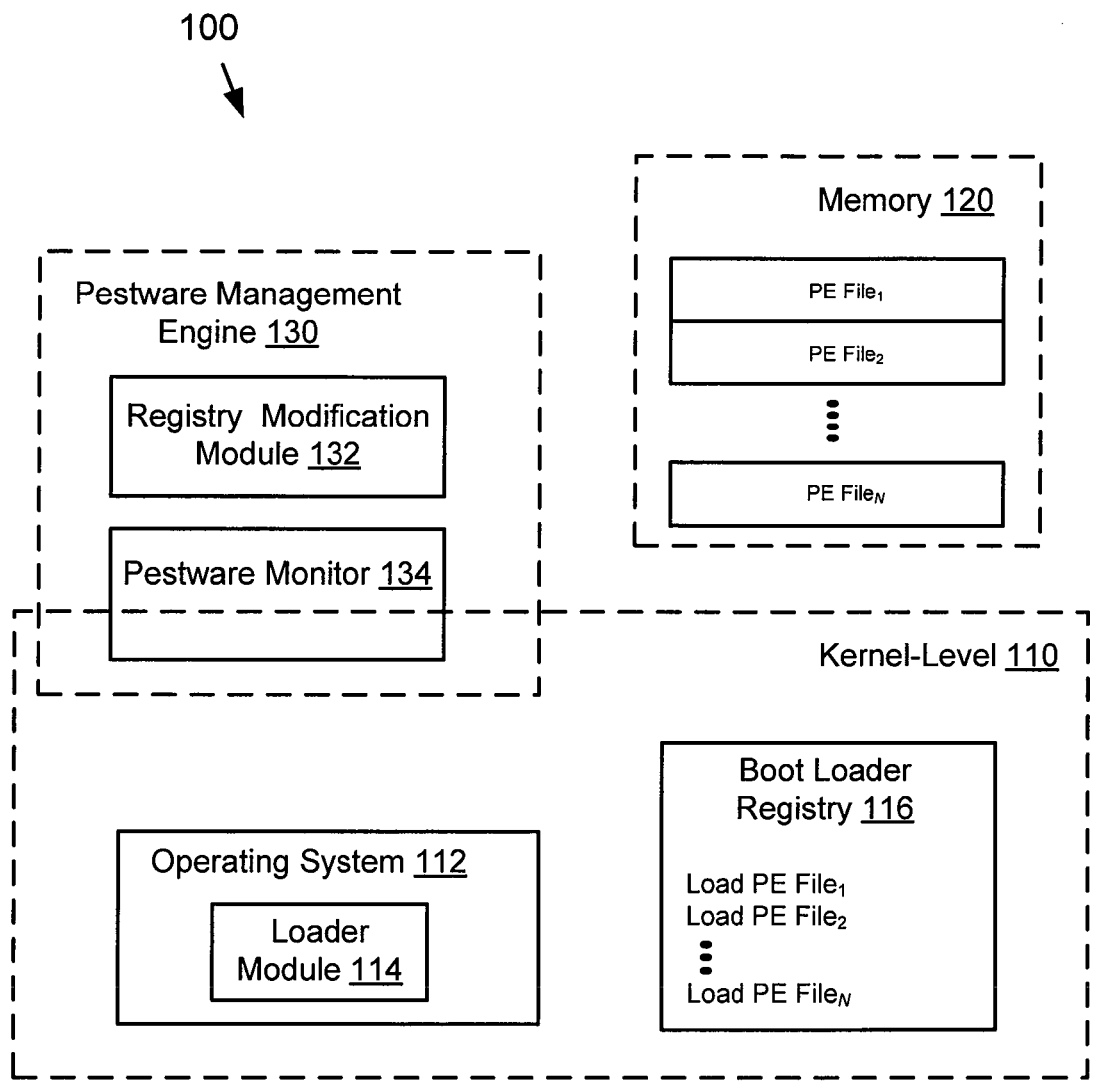
FIG. 1 illustrates a schematic diagram of a computer system configured to enable a driver to access user-level data during boot-time, according to an embodiment of the invention.

According to several embodiments, the present invention enables access to user-level data that is associated with one or more kernel-level functions during early boot-time of a computer system. User-level data is data in a user-level file that is generally available, for example, to a user-level application only after a computer system has booted-up. User-level files are not available to, for example, a device driver during early-boot time because file system drivers that enable the reading of user-level files have not been loaded. Early boot-time is a time during a boot-up sequence of a computer system when files such as portable executable (PE) files are being loaded as boot-files by a boot loader of an operating system (OS) of the computer system before the OS (and file system drivers) has been entirely loaded. Typically only PE files (e.g., executable file, system file, or dynamic link library (DLL) file) such as kernel-level drivers (e.g., system drivers) are loaded during boot-time as boot-files.

According to many implementations, a boot loader registry of a computer is modified so that a user-level file that is structured like a portable executable (PE) file and contains user-level data is loaded as a boot-file during boot-time (e.g., early boot-time). In other words, the computer is tricked into loading the user-level file, which would not otherwise be loaded because it is not an actual boot-time PE file, during boot-time. The user-level data is then accessed from the user-level file by one or more driver and/or dummy PE files that are also loaded as boot-files during boot-time. A user-level file that is structured like a PE file and includes user-level data, but does not include instructions for driver functions/capabilities that are usually included in a boot-time PE file, is referred to herein as a user-level PE file. An example of such a user-level PE file in the context of a WINDOWS operating system is NTDLL.DLL.

A driver PE file (e.g., device driver or a filter driver) and/or dummy PE file (e.g., dummy DLL file) are used, in some implementations, to access user-level data from a user-level PE file during boot-time. PE files configured to retrieve user-level data from a user-level PE file during boot-time can be referred to as a user-level-data-retrieving PE file. In some variations, combinations of dummy PE files and/or driver PE files are loaded by an OS and used to make the user-level data available during boot-time.

One or more PE files are configured, in some embodiments, to make the user-level data available to a driver (e.g., filter driver) during boot-time. In many embodiments, the user-level data is data retrieved from a user-level PE file such as an NTDLL.DLL file and the driver is a pestware monitor such as a kernel-level pestware monitor associated with a pestware management engine. The pestware monitor can use the user-level data from the NTDLL.DLL file to modify entries in a jump table, thereby enabling the pestware monitor to intercept calls to kernel-level/mode functions based on the jump table.

Referring now to the drawings, where like or similar elements are designated with identical reference numerals throughout the several views, and referring in particular to FIG. 1, it illustrates a schematic diagram of a computer system 100 configured to enable a driver (e.g., filter driver) to access user-level data included in a user-level PE file during boot-time. FIG. 1 shows a kernel-level 110, a memory 120, and a pestware management engine 130. The pestware management engine 130 includes a registry modification module 132 that modifies at least one registry entry included in a boot loader registry 116 associated with the kernel-level 110 of the computer system 100. A loader module 114 at the kernel-level 110 uses the modified registry entries in the boot loader registry 116 to load files in the memory 120 as boot-files during boot-time. The files loaded as boot-files include and/or are used to retrieve, during boot-time, user-level data that can be later accessed by the pestware management engine 130. The details of these components/applications are described in more detail below.

The memory 120 of the computer system 100 is configured to store images of PE files 1 through N. The PE files can be user-level PE files, driver PE files, and/or dummy PE files. The user-level PE file includes, for example, user-level data (e.g., NTDLL.DLL file) that is to be retrieved for use by, for example, the pestware management engine 130 during boot-time. The memory 120 can be any combination of volatile or non-volatile memory such as a RAM, ROM, hard drive, or flash memory. In many implementations, the memory 120 and the files stored within the memory 120 are accessible using a driver and/or a user-level application. The memory 120 can also be used to store many types of files that are not PE files.

The kernel-level 110 includes the boot loader registry 116 and an operating system 112 with the loader module 114. The boot loader registry 116 is a registry that includes entries (e.g., references) that are used by the loader module 114 to load functions/applications (e.g., drivers) associated with the computer system 100 as boot-files. The entries within the boot loader registry 116 include one or more references to the PE files within the memory 120. In this example embodiment, the load PE file$_1$ entry within the boot loader registry 116 is a reference used by the loader module 114 to trigger the loading of PE file$_1$ during boot-time of the computer system 100. Each entry within the boot loader registry 116 does not have to be associated with a single file in the memory 120. In some embodiments, the loader 114 loads the PE files within the memory 120 during early-boot time of the computer system 100.

The pestware management engine 130 includes a pestware monitor 132 and a registry modification module 134. In general, the pestware monitor 132 is responsible for detecting pestware or pestware activity on the computer system 100. In several embodiments the pestware monitor 134 is configured to intercept system calls made by potential-pestware processes and analyze the potential-pestware processes before allowing the system calls to be effectuated. In many embodiments the pestware monitor 134 obtains user-level data from one or more of the user-level PE files that facilitates the interception of system calls.

In one embodiment for example, the pestware monitor 134 obtains an index to system functions from a user-level PE file and uses information from the index to hook the kernel functions. Although user-level PE files are not typically loaded by operating systems during an early-boot time, user-level PE files may be loaded by the loader module 114 (e.g., NTLDR) during early-boot time. Data extracted from the user-level PE files during the early-boot time may also be used both during and after the early-boot time. As discussed further herein, in many embodiments the index of the kernel functions is obtained from a user-level PE file (e.g., NTDLL.DLL) that is loaded by the loader module 114 during the early-boot time of the computer system 100.

Although some addresses of kernel functions may be obtained by other techniques (e.g., from the function entry points) not all functions are exported by the operating system (e.g., by NTOSKRNL). In the context of a WINDOWS operating system, however, a user-level PE file (e.g., NTDLL.DLL) does export substantially all pertinent kernel functions. As a consequence, many embodiments of the present invention provide easier access to indexes of kernel-level functions during boot-time than known techniques. Moreover, in many instances the user-level PE file (e.g., NTDLL.DLL) is updated whenever the operating system 112 is updated so the pestware monitor 134 automatically has access to up-to-date information about locations of the kernel functions.

In many embodiments, the pestware monitor 134 includes a filter driver (not shown) that is configured to hook kernel functions using an index of the kernel functions. In operation, the filter driver in these embodiments intercepts system calls to enable the processes that are making the calls to be analyzed before allowing the calls to be effectuated. In many variations the filter driver is loaded as early as possible during an early boot-time of the computer system so that it may be installed before any pestware-related rootkits attempt to load. Thus, the user-level PE file (e.g., NTDLL.DLL) is also loaded during early boot-time, according to many embodiments of the present invention, to enable the filter driver to access user-level data included in the user-level PE file.

Although not required, in some variations the pestware monitor 134 includes user-level pestware-detection code that communicates with a kernel-level filter driver. In these embodiments, when the filter driver intercepts a system call, the filter driver communicates information about the source of the system call to the user-level pestware detection code, and the user-level pestware detection code analyzes the process generating the call to assess whether the process is a pestware-related process. If the process is determined to be pestware-related, the user-level pestware detection code directs the filter driver to prevent the system call from being effected; otherwise the call is allowed to reach the intended kernel function. In other embodiments, the filter driver itself includes pestware detection code and is able to analyze processes without communicating with user-level applications. More details related to pestware detection and kernel-level pestware management are set forth in commonly assigned and co-pending application Ser. No. 11/257,609, filed Oct. 25, 2005, entitled System and Method for Kernel-Level Pestware Management, which is incorporated herein by reference.

In addition to analyzing processes, the pestware monitor 132 can also check WINDOWS registry files and similar locations for suspicious entries or activities. Further, the pestware module 132 can check a hard drive for third-party cookies.

The registry modification module 132 in this embodiment is configured to modify the boot loader registry 116 to include registry entries corresponding to files that are to be loaded by the loader module 114 as boot-files. In this embodiment, the registry modification module 132 is configured to modify the boot loader registry 116 so that the loader 114 loads PE files (e.g., driver, dummy, and/or user-level PE files) that will facilitate retrieval of user-level data (e.g., an index of kernel-level functions) that can be used by the pestware management engine 130. When the operating system 112 is realized by a WINDOWS operating system, for example, the registry modification module 132 may add a reference to NTDLL.DLL to the boot loader registry so that, during an early-boot time, NTDLL.DLL is mapped into memory; thus enabling indexes of function calls to be available (e.g., to a filter driver of the pestware monitor 134) during the early-boot time.

The registry modification module 132 can be configured so that the boot loader registry 116 is modified when the registry modification module 132, for example, is first loaded/installed on the computer system 100. The registry modification module 132 can be configured to modify the boot loader registry 116 to include entries that will load any file (e.g., a filter driver) associated with the pestware management engine 130 (e.g., pestware monitor 134).

Each of the components/modules within the pestware management engine 130 and the kernel-level 110 of the computer system 100 can be implemented in software and/or hardware. If implemented in software, the components/modules can be designed to operate on any type of computer system 100 including WINDOWS and Linux-based systems Additionally, the software can be configured to operate on personal computers and/or servers. For convenience, embodiments of the present invention are generally described herein with relation to WINDOWS-based systems. Those of skill in the art can easily adapt these implementations for other types of computer systems 100.

Figure 2:
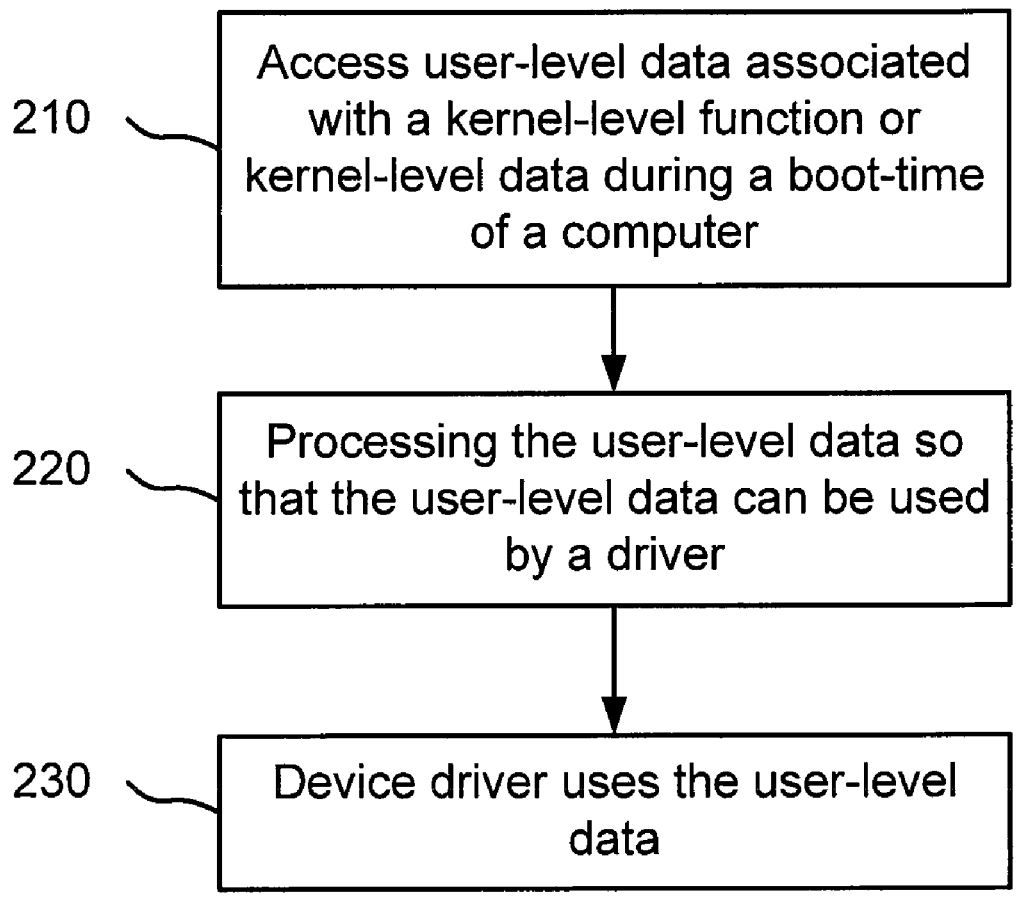
FIG. 2 illustrates a flowchart for accessing user-level data, during boot-time, for a driver, according to an embodiment of the invention.

FIG. 2, illustrates a flowchart for accessing user-level data from a user-level PE file for a function such as a pestware monitor (e.g., the pestware monitor 134) during a boot-time of a computer system. First, user-level data associated with a kernel-level function during the boot-time of the computer system is accessed (block 210). In some instances, the user-level data, although not typically available during early boot-time, is loaded during early boot-time so that the user-level data can be accessed. The user-level data is, for example, included in a user-level PE file that contains an index associated with one or more kernel-level functions (e.g., an application program interface (API) call). In many embodiments, the user-level data is accessed using a driver and/or dummy PE file, but a person of skill in the art will appreciate that the user-level data can be accessed/made available during boot-time using any type of file/function that can be loaded during the boot-time of a computer.

After the user-level data has been accessed (block 210), the user-level data is processed so that the user-level data can be used by a driver (e.g., filter driver) (block 220) during boot-time. The processing may include, for example, reading and/or parsing the user-level data, writing to the user-level data, extracting relevant information from the user-level data, and/or storing the information in a location where it can be retrieved by, for example, a driver. In some embodiments, a copy of the user-level data is stored in a location that has been allocated for use by the driver or even a user-level application at a later time.

In some variations, the processing is performed using a PE file that is the driver and/or associated with the driver (e.g., dummy PE file). For example, a PE file(s) such as a driver PE file and/or a dummy PE file that are associated with the driver can be loaded during, for example, early boot-time to process user-level data from, for example, a user-level PE file so that the data can be accessed by the driver. In many embodiments, the user-level data is processed such that the driver can interpret an output related to the user-level data that is produced by the PE file(s). For example, pointers to the user-level data that can be interpreted and used by the driver can be stored in a location that can be accessed (e.g., read) by the driver. As another example, the user-level data can be compressed and/or encrypted such that the user-level data in the output can be read by the driver. A person of skill in the art can recognize that the user-level data can be processed using any type of file/function, in addition to or in place of a PE file, that can be loaded by the computer.

Finally, the driver uses the user-level data (block 230). The driver can use the user-level data at any time after the user-level data has been made available to the driver. For example, the driver can use the user-level data during and/or after boot-time (e.g., late in a boot-up sequence). In some embodiments, the user-level data is data that is used by the driver to enhance the functionality of the driver.

The driver that uses the user-level data can be a kernel-level function such as a kernel-level pestware monitor. The pestware monitor can store pointers to the user-level data and/or can store a copy of the user-level data. The pestware monitor can be a kernel-level monitor that begins execution early in the boot and operating system loading process on a computer system. If the user-level data contains index information related to, for example, API calls, the pestware monitor can use the user-level data to intercept and monitor various operating system behaviors. These behaviors include attempts by pestware to modify the behavior of the operating system through the use of patches and hooks or by invoking other mechanisms that could be used to alter information passed to or from the operating system. More details related to intercepting API calls using a pestware monitor are set forth in the above-referenced application entitled System and Method for Kernel-Level Pestware Management.

Figure 3:
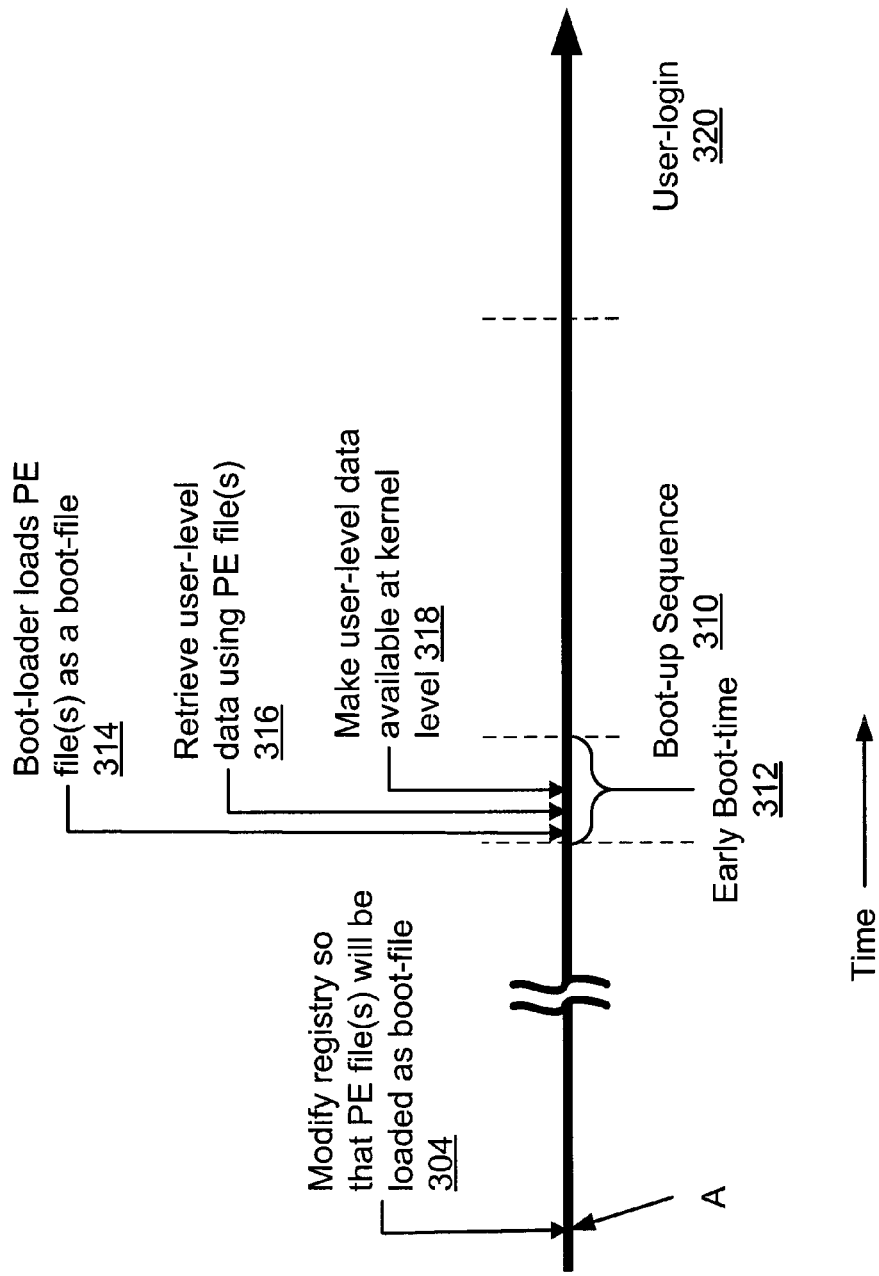
FIG. 3 illustrates a time-line that shows the use of a PE file configured to access and make user-level data of a computer system available, according to an embodiment of the invention.

FIG. 3 is a time-line that illustrates the use of one or more PE files to access and/or make user-level data of a computer system available during a boot-time of the computer system. Specifically, a boot loader registry of the computer system is modified (e.g., a registry entry or reference in the registry) to cause an operating system of a computer to load the PE file(s) as boot-files. Once loaded, the PE file(s) is used to make user-level data available during boot-time. Time is increasing to the right in this time-line.

FIG. 3 illustrates an early boot-time 312 period within a boot-up sequence 310 time period. During the boot-up sequence 310 time period the computer system is initializing and preparing for later use by loading various programs such as an operating system. During the early boot-time 312 PE files are typically loaded by the operating system of the computer system as boot-files. After the computer system has booted-up, a user can utilize the applications/functions of the computer system during a user-login 320 time period (e.g., terminal services).

FIG. 3 shows that, at time A (a time before the boot-up sequence 310), the boot loader registry of the computer system is modified so that the computer system will load the PE file(s) 304 during the boot-up sequence 310 time period as boot-files. The boot loader registry is used by, for example, a boot-loader (e.g., the loader module 114) of an operating system (e.g., the operating system 112) to load PE files such as boot driver PE files during the early boot-time 312 of the boot-up sequence 310. The boot-loader is triggered by the computer system (e.g., usually when the computer system is activated) to load PE files as boot-files during the early boot-time 312. The boot loader registry can be modified at any time before the boot loader registry will be used to load the PE file(s) 304 during the boot-up sequence 310. For example, the registry can be modified (e.g., by the registry modification module 132) during a software installation time period (not shown) when the computer is running (e.g., after a prior boot-up sequence).

The PE file(s), in this embodiment, is a driver (e.g., filter driver), dummy and/or a user-level PE file that is configured to be loaded as a typical boot-file. In many embodiments, the PE file(s) can include and/or can be configured only to access user-level data after being loaded rather than function as a typical boot-file (e.g., system driver) of the computer system. In some embodiments, the PE file(s) can also be configured to function as a typical boot driver.

If two or more PE files (e.g., dummy and/or driver PE files) are loaded, the PE files can be configured to operate in concert to retrieve user-level data during early boot-time 312. For example, a first driver, user-level, dummy, and/or non-driver PE file can be loaded and used to access a second driver, user-level, or dummy, and/or non-driver PE file that is loaded and contains the user-level data. Specific examples of this type of implementation are described with reference to FIGS. 3-5.

During the early boot-time 312, the PE file(s) is loaded as a boot-file 314 by the boot-loader of the computer system. The PE file(s) also retrieves and/or includes user-level data 316 during early boot-time 312. In this embodiment, the user-level data is data that is typically used after the boot-up sequence 310.

The PE file(s) is, in some embodiments, configured to retrieve and/or include at least a portion of, for example, an index associated with kernel-level functions (e.g., kernel-level index) that is generally only available after the boot-up sequence 310. In some embodiments, a user-level PE file that contains a kernel-level index is loaded as a boot-file and can be read by a separate PE file. The registry (e.g., boot loader registry) of the computer system can be modified to cause the computer system to load the kernel-level index as a boot-file during early boot-time 312. An example of this implementation is described in connection with FIG. 3.

The PE file(s) also can be configured to make the retrieved user-level data available to a driver during the early boot-time 312. In some implementations, the user-level data is stored in a location and formatted such that the user-level data is accessible by a driver. For example, the user-level data can be stored in the PE file(s) or in a user-level accessible memory location. In many embodiments, the user-level data is processed by the PE file(s) such that a driver can access the user-level data, for example, using pointers to the user-level data. As another example, the user-level data can be compressed and/or encrypted such that the user-level data can be read by, for example, a particular filter driver.

In some implementations, the user-level data is stored in a location such that only a driver with proper authorization can access the user-level data during the boot-up sequence 310 (e.g., password protected, stored in a protected location). Although in this embodiment, the user-level data is accessed during the boot-up sequence, in some embodiments, the user-level data is made available and accessible at any time after the user-level data is retrieved (e.g., any time during and/or after boot-time).

Figure 4:
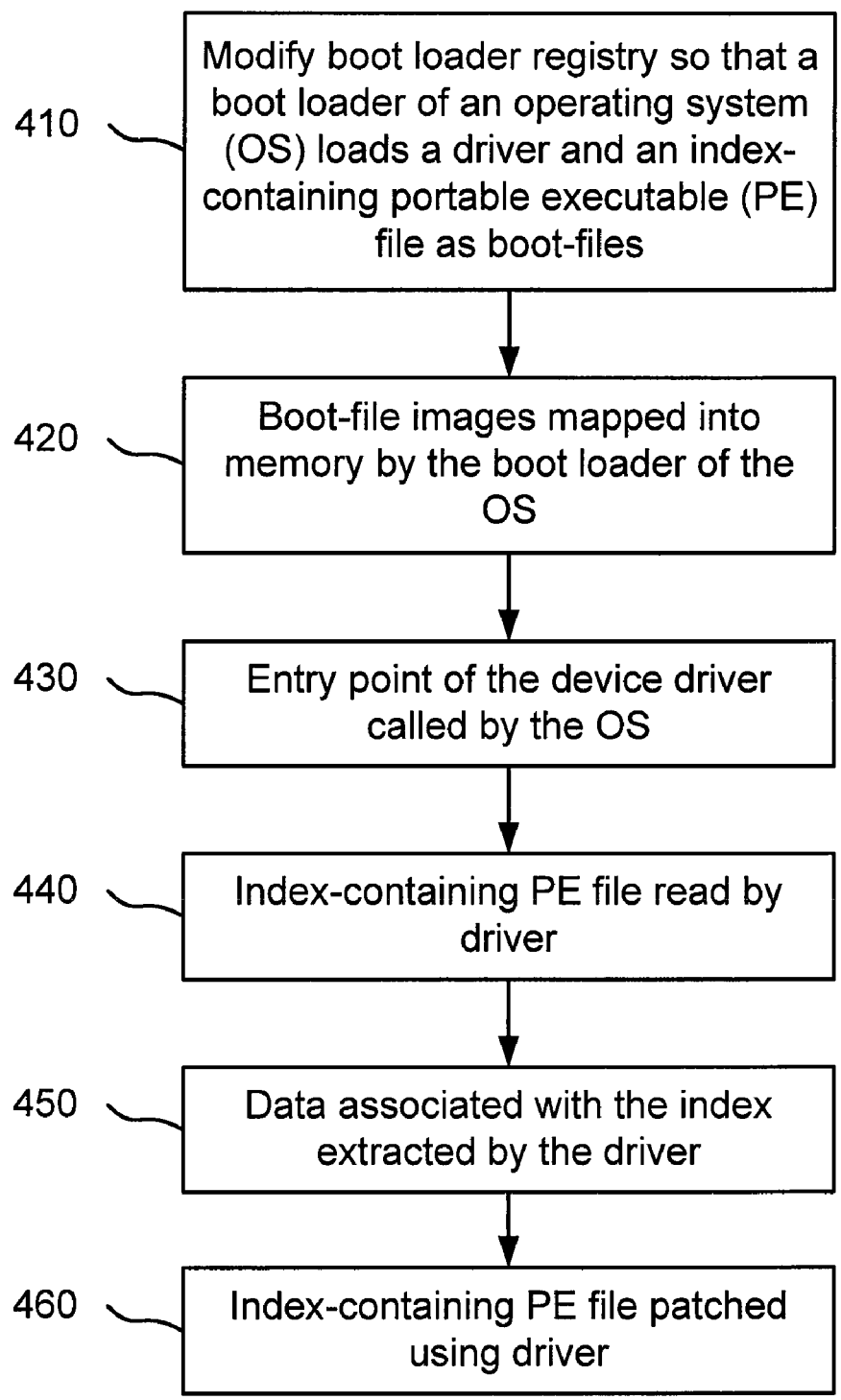
FIG. 4 is a flowchart that illustrates a method for retrieving index information using a driver, according to an embodiment of the invention.

FIG. 4 is a flowchart that illustrates an example embodiment of the present invention that includes using a driver (e.g., filter driver, PE file) to retrieve index information from a user-level PE file that is an index-containing PE file. The index-containing PE file is a user-level PE file can also be referred to as an index. Both the driver and the index-containing PE file are loaded by a boot loader as boot-files according to a boot loader registry (e.g., boot loader list) associated with the operating system.

As shown in FIG. 4, the boot loader registry is modified so that the boot loader of an operating system will load the driver and the index-containing PE file as boot-files (block 410). The boot loader registry is modified by including, for example, one or more entries (e.g., references) that will cause the boot loader to load the driver and the index-containing PE file. The index-containing PE file is a user-level PE file such as NTDLL.DLL that contains index information for a jump table that is used to call kernel-level/mode functions. In this embodiment, the boot loader registry is modified so that the driver is loaded before the index-containing PE file.

Based on the boot loader registry that has been modified to load the driver and the index-containing PE file, boot-file images are mapped into memory by the boot loader of the operating system (block 420). Even though the index-containing PE file is not an actual boot-file and would not normally be loaded by the boot loader of the operating system, the boot loader will load the index-containing PE file as a boot-file because it is included in the boot loader registry and has a PE file structure similar to a boot-file.

The entry point of the driver is then called by the operating system (block 430) and the driver reads the index-containing PE file (block 440). The driver is, in some embodiments, configured to read only specified portions of the index-containing PE file such as a specific address in the PE file.

User-level data associated with the index is extracted by the driver (block 450) to a location that can be later accessed by, for example, the driver (e.g., filter driver) or another driver. Finally, the index-containing PE file is patched using the driver (block 460). The PE file is patched so that the index-containing PE file can be unloaded by the operating system without causing, for example, an unrecoverable operating system error or fault. In some embodiments, the index-containing PE file is patched so that when the entry point of the index-containing PE file is called by the operating system as part of the boot-up sequence, the index-containing PE file will return, for example, a benign error code that will not cause a computer system crash. In other words, the index-containing PE file is mapped, but not executed.

Figure 5:
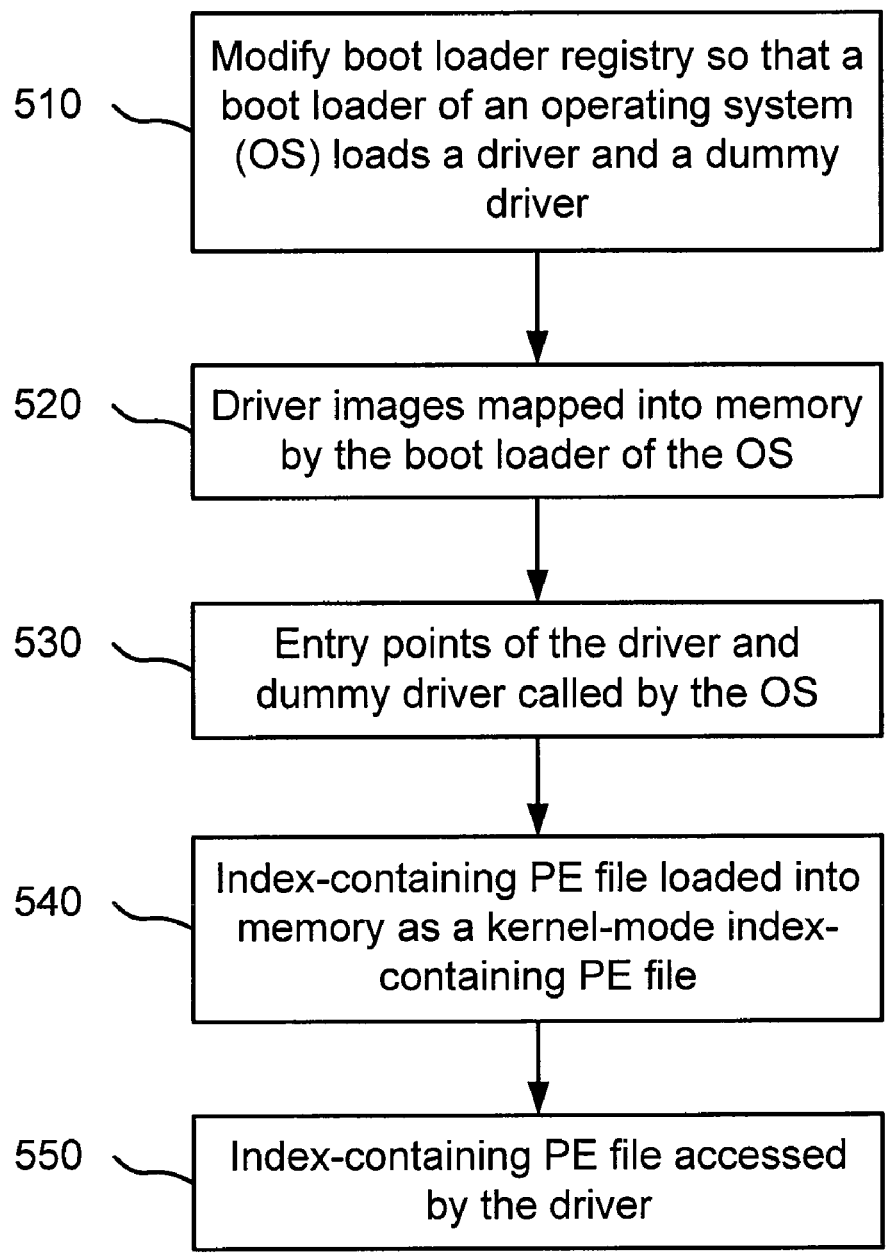
FIG. 5 is a flowchart that illustrates another method for retrieving index information using a driver, according to an embodiment of the invention.

FIG. 5 is a flowchart that illustrates an example embodiment of the present invention that includes using a driver (e.g., PE file) to retrieve index information from an index-containing PE file (user-level PE file) that is linked (e.g., imported) to a dummy driver PE file (also referred to herein as a dummy driver). Specifically, the index-containing PE file (e.g., NTDLL.DLL) is included in the import table of the dummy driver. Because the index-containing PE file is included in the import table of the dummy driver, the index-containing PE file is loaded by an OS of a computer system as a kernel-mode index-containing PE file (also referred to as a kernel-mode file) that can be accessed by the driver. The entry point of the index-containing PE file will not be called by the OS because it is loaded as a kernel-mode DLL. Both the driver and the dummy driver are loaded by a boot loader as boot-files according to a boot loader registry (e.g., boot loader list) associated with the OS.

As shown in FIG. 5, the boot loader registry is modified so that the boot loader of an operating system will load the driver and the dummy driver as boot-files (block 510). The boot loader registry is modified to include, for example, entries (e.g., references) that will cause the boot loader to load the driver and the dummy driver. The dummy driver is a driver that includes a link to the index-containing PE file in its import table. The dummy driver can be configured with substantially no other functionality except to trigger the loading of the index-containing PE file. In some embodiments, the index-containing PE file is an NTDLL.DLL file. In this embodiment, the boot loader registry is modified so that the driver is loaded before the dummy driver.

The dummy driver is used to import the index-containing PE file to prevent potential conflicts that could arise if the index-containing PE file were directly imported by the driver. For example, the index-containing PE file could contain entries in an export table that could conflict with entries in an export table of a library such as a separate DLL that is critical to the functionality of the driver (e.g., NTOS file).

Based on the boot loader registry that has been modified to load the driver and dummy driver boot-files, boot-file images are mapped into memory by the boot loader of the operating system (block 520). In many implementations, the driver and the dummy driver can be installed on a computer system during a software installation time period. The driver and the dummy driver can be called from their respective locations when installed (e.g., hard drive memory location) and mapped into memory (e.g., random access memory (RAM)).

The entry point of the driver and dummy driver are then called by the operating system (block 530). Because the index-containing PE file is included in the import table of the dummy driver, the index-containing PE file is loaded into memory by the OS as a kernel-mode index-containing PE file (e.g., kernel-mode file) (block 540) when the entry point of the dummy driver is loaded into memory by the OS. In other words, the dummy driver is used so that the index-containing PE file is mapped, but not executed.

After the index-containing PE file is loaded as a kernel-mode DLL (block 540), the driver accesses the index-containing PE file (block 550). Information (e.g., data) associated with the index-containing PE file (e.g., user-level data associated with a kernel-level function) can be exported by the driver to a location that can be later accessed by, for example, the driver or another system driver. The driver is, in some embodiments, configured to read only specified portions of the index-containing PE file (e.g., specific address or entry). Because the index-containing PE file is loaded as a kernel-mode file, the entry point of the index-containing PE file will not be called by the OS.

Figure 6:
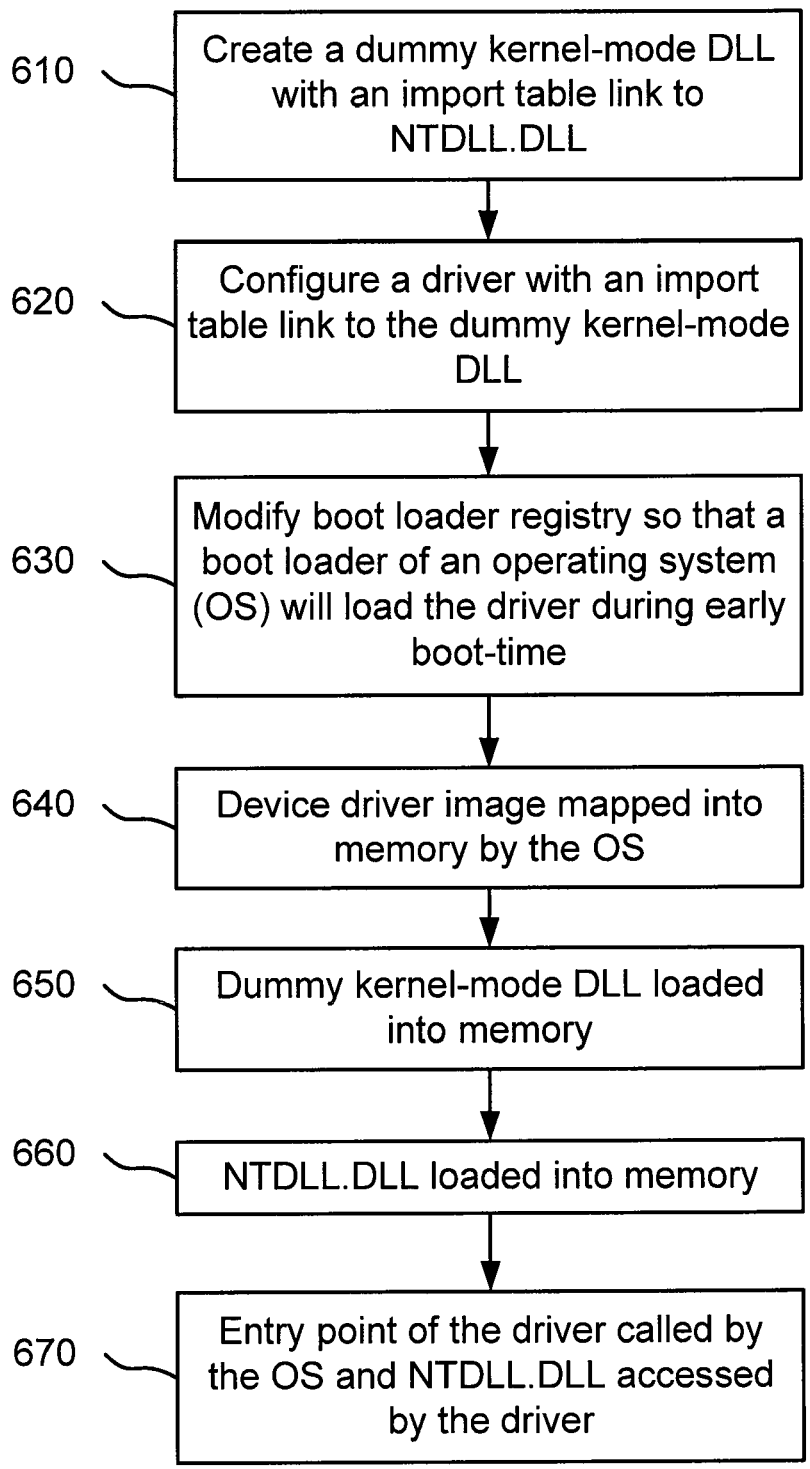
FIG. 6 is a flowchart that illustrates yet another method for retrieving index information using a driver, according to an embodiment of the invention.

FIG. 6 is a flowchart that illustrates another example embodiment of the present invention that includes using a driver (e.g., filter driver) to a retrieve user-level data from an NTDLL.DLL file (the NTDLL.DLL file can also be referred to as an index-containing PE file and is a user-level PE file). The driver is linked to a dummy kernel-mode DLL file and the dummy kernel-mode DLL file is linked to the NTDLL.DLL file. These links are created to trigger the loading of files in a cascading fashion. When the driver is loaded by an OS of a computer system, the link in the driver will trigger the loading of the dummy kernel-mode DLL. Subsequently, the link in the dummy kernel-mode DLL file will trigger the loading of the NTDLL.DLL file. Once loaded, the NTDLL.DLL file can be accessed by the driver.

As shown in FIG. 6, a dummy kernel-mode DLL file with an import table link to NTDLL.DLL is created (block 610). The dummy kernel-mode DLL file can be created and configured with no other functionality except to act as a DLL file that will trigger the loading of the NTDLL.DLL file. The driver is configured with an import table link to the dummy kernel-mode DLL file (block 620). The import table link to the dummy kernel-mode DLL file that is included in the driver is created so that when the entry point of the driver is called, the dummy kernel-mode DLL file will be loaded. The import table link to NTDLL.DLL that is included in the kernel-mode DLL file is created so that when the kernel-mode DLL file is loaded, NTDLL.DLL will be loaded such that it can be accessed by the driver.

A boot loader registry is modified so that a boot loader of the OS will load the driver during early-boot time of the OS (block 630). The boot loader registry is modified to include an entry (e.g., reference) that will cause the boot loader to load the driver. During early boot-time, the driver is mapped into memory by the boot loader of the OS (block 640). The link to the dummy kernel-mode DLL included in the driver causes the OS to load the dummy kernel-mode DLL into memory (block 650) and the link to NTDLL.DLL included in the dummy kernel-mode DLL causes the OS to load NTDLL.DLL into memory (block 660).

After the NTDLL.DLL file is loaded (block 660), the entry point of the driver is called by the OS and the driver accesses the index-containing PE file (block 670). Information (e.g., data) associated with the NTDLL.DLL file (e.g., user-level data associated with a kernel-level function) can be exported by the driver to a location that can be later accessed by, for example, a filter driver. Because the NTDLL.DLL file is loaded using the dummy kernel-mode DLL file, the entry point of NTDLL.DLL is not called by the OS. In other words, the index-containing PE file is mapped, but not executed.

Although the flowcharts shown in FIGS. 4-6 illustrate the accessing of user-level data in an index-containing PE file such as an NTDLL.DLL file, a person of skill in the art will appreciate that these techniques can be employed to access any type of file (e.g., any type of dummy PE file, non-driver PE file, or driver PE file) during a boot-up sequence of a computer (e.g., during early boot-time). A person of skill in the art will also appreciate that these flowcharts can be altered by rearranging the order of the steps in the flowcharts and/or multiple levels of links in import and/or export tables of, for example, PE files can be used to access and extract the user-level data. Also, the blocks within each of the flowcharts can be performed at different times. For example, some blocks can be performed during a software installation period and some blocks can be performed during early boot-time of a computer system.

In conclusion, the present invention provides, among other things, methods for enabling access to user-level data during boot-time of a computer system. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:
    accessing at least a portion of a user-level index associated with a kernel-level function during an early boot-time of a computer; and
    processing the portion of the index using the computer;
    wherein the user-level index is a file with a structure that is substantially similar to that of a portable executable (PE) file.

2. The method of claim 1, wherein the processing includes transmitting the portion of the user-level index to a location that can be accessed by a pestware monitor.

3. The method of claim 1, wherein the processing includes processing the portion of the user-level index so that user-level data associated with the user-level index can be accessed by a pestware monitor.

4. The method of claim 1, wherein the processing includes processing the portion of the user-level index so that user-level data associated with the user-level index can be accessed by a pestware monitor, the pestware monitor is at least one of a kernel-level monitor or a user-level monitor.

5. The method of claim 1, further comprising modifying a boot loader registry during an installation period so that the portion of the user-level index can be accessed.

6. The method of claim 1, wherein the accessing includes accessing using at least one PE file.

* * * * *